United States Patent [19]

Ulmer

[11] 4,164,638
[45] Aug. 14, 1979

[54] METHOD FOR FLASH BUTT WELDING OF ANNULAR WORKPIECES

[75] Inventor: Klaus Ulmer, Dortmund, Fed. Rep. of Germany

[73] Assignee: Hugo Miebach GmbH, Dortmund, Fed. Rep. of Germany

[21] Appl. No.: 926,158

[22] Filed: Jul. 19, 1978

[30] Foreign Application Priority Data

Jul. 26, 1977 [DE] Fed. Rep. of Germany ....... 2733559

[51] Int. Cl.² ............................................. B23K 11/04
[52] U.S. Cl. ....................................... 219/100; 219/52
[58] Field of Search ...................... 219/100, 97, 51, 52

[56] References Cited

U.S. PATENT DOCUMENTS

| 2,144,319 | 1/1939 | Taylor | 219/100 |
|---|---|---|---|
| 2,234,855 | 3/1941 | Rhhse | 219/100 |

FOREIGN PATENT DOCUMENTS 1231363 12/1966 Fed. Rep. of Germany ............ 219/52

Primary Examiner—E. A. Goldberg
Attorney, Agent, or Firm—Max Fogiel

[57] ABSTRACT

A method for flash butt welding of annular workpieces, particularly chain links, in which the ends of the workpiece to be welded together, are preheated before flashing and upsetting by controlling the feeding force for the upsetting slide in several successive preheat time cycles. The feeding force during the first preheat time cycle is minimized during the first preheat time cycle and progressively increased during advancing preheat time cycles, dependent on the increase in force required for workpiece deformation. The feeding force may have a decreasing increment during advancing preheat time cycles. The feeding force may also have a stepwise increase per preheat time cycle. The feeding force may, moreover, have a continuous increase.

6 Claims, 2 Drawing Figures

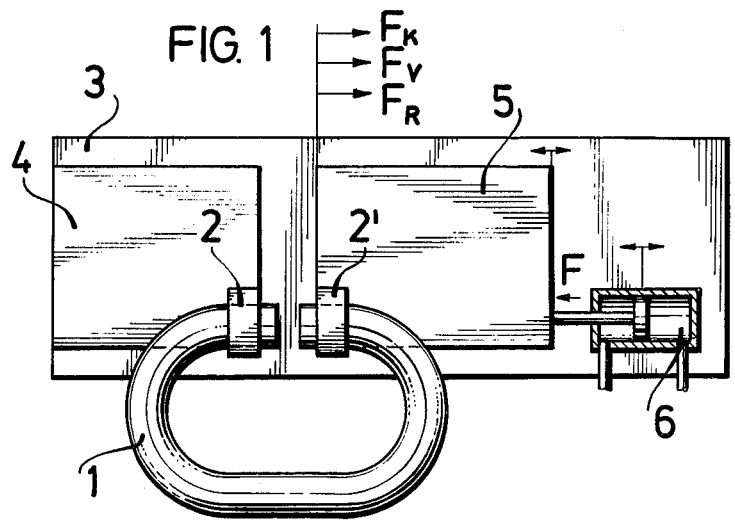
FIG. 1
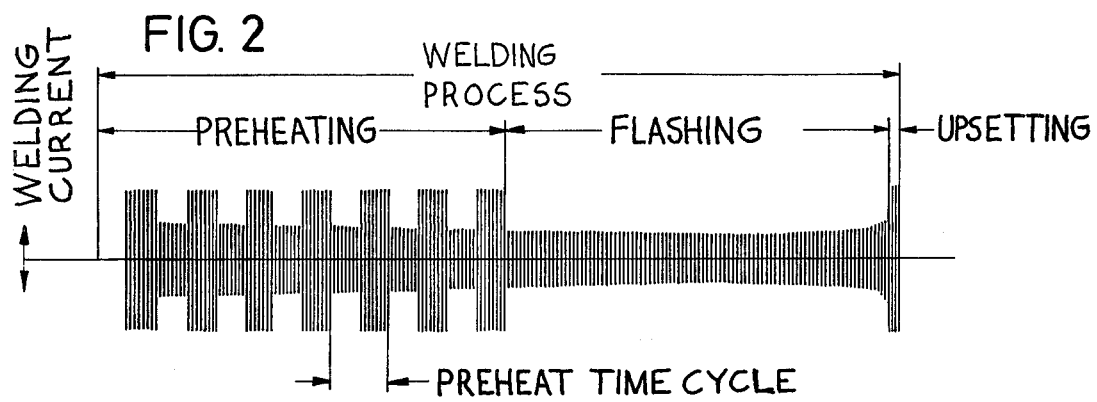
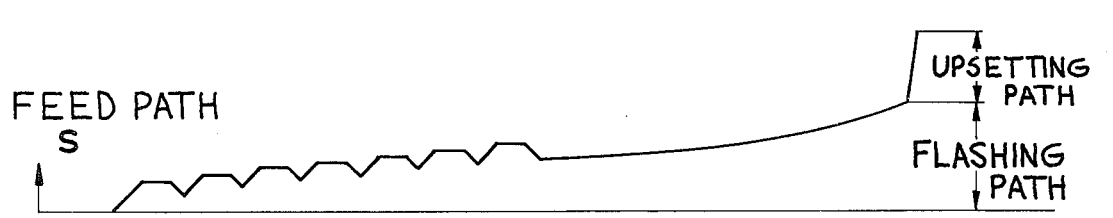
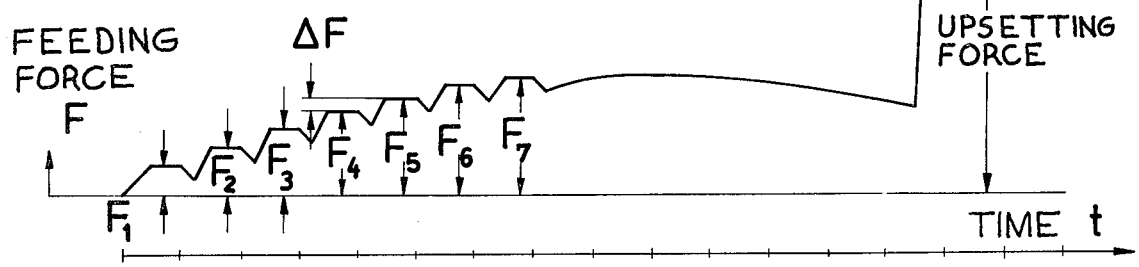

METHOD FOR FLASH BUTT WELDING OF ANNULAR WORKPIECES

BACKGROUND OF THE INVENTION

The present invention relates to a method for the flash butt welding of annular workpieces, such as chain links in which the ends of the workpiece that are to be welded to each other, are first preheated in several successive preheat time cycles and then are welded together by subsequent flashing and upsetting.

In flash butt welding by means of direct or alternating current, the preheating is used to apply a sufficient amount of heat, depth of heat, and welding temperature to the two workpiece ends to be welded together for subsequent welding by flashing and upsetting. The heat energy applied to the workpiece ends during the preheat time cycles can be expressed by $I^2 \times R \times t$ where I = welding current
R = resistance of workpiece including the transfer resistance between the two workpiece ends
t = total preheating time.

The welding current is given by the secondary voltage of the welding transformer stage, the impedance of the welding machine, the weld cross-section, and the chemical composition of the workpiece to be welded. The total preheating time is determined by the weld cross-section, the welding current density, and the chemical composition of the workpiece to be welded. Hence, optimization of the preheating process can be achieved only via the variable transfer resistance between the workpiece ends which must be made as large as possible to achieve rapid heating.

Based on the relation that the transfer resistance between the workpiece ends to be welded is increased and the heating of the workpiece ends is speeded up, the smaller the contact force between the workpiece ends during the preheat time cycles, in order to optimize the preheating operation, then minimum contact force is used between the workpiece ends in case of stretched workpieces (open lengths). The contact force as difference between feeding force and friction of the upsetting slide becomes smaller as the feeding force is reduced. As a rule, one selects a feeding force which is about 20% above the force required to overcome the friction.

With annular workpieces, among which are chain links, a force to deform the workpiece rear is required in addition to achieve the required contact force and to overcome the carriage friction. At the present time it is customary to make the feeding force for annular workpieces from the very outset so high, that sufficient feed of the upsetting slide is ensured during the entire preheating operation, and dispensing in such a case with the desired minimum contact force during the initial preheat time cycles.

Based on this state of the art, it is the object of the present invention to develop a method which provides optimization of the preheating process for annular workpieces to achieve maximum speed of preheating of the workpiece ends to be welded.

Another object of the present invention is to provide a method of the foregoing character which is simple to apply and may be used economically.

A further object of the present invention is to provide a method, as described, in which the welded ends have a substantially long service life.

SUMMARY OF THE INVENTION

The objects of the present invention are achieved in the flash butt welding of annular workpieces, particularly chain links, where the workpiece ends to be welded together are preheated before flashing and upsetting by controlling the feeding force for the upsetting slide in several successive preheat time cycles. The feeding force during the first preheat time cycle is made as small as possible and increasingly larger as the force required for workpiece deformation is increased during progressive preheat cycles.

In accordance with the present invention, the advantage of minimum contact force throughout the entire preheat operation can be utilized also for annular workpieces; hence optimization of the preheating process with maximum speed of heating the workpiece ends to be welded is possible. In accordance with the present invention, there is no longer an undesirable upsetting of the workpiece ends during the initial preheat time cycles, as is the case with the feeding force which up to the present time was made too high at the outset. The preheating operation in accordance with the present invention is more uniform and more reproducible.

In the simplest embodiment, a constant increase in feeding force after each preheat cycle is provided.

In another embodiment of the present invention, the fact that the deformation resistance of the workpiece decreases during preheating due to increased heating of the workpiece, is taken into consideration by a decreasing feeding force increment as the preheat time cycles advance.

Instead of a stepwise increase in feeding force after each preheat time cycle, the force increase can also be made continuous.

According to a preferred embodiment, the feeding force is changed depending on the advancing preheat time cycles, the change in feeding path (stroke), and the increase in welding time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a schematic top view of a flash butt welding machine; and

FIG. 2 shows graphical recordings of welding current I, carriage feed S, and feeding froce F vs. time for the method in accordance with the present invention.

DESCRIPTION OF THE PREFERRED EMBODIMENT

According to FIG. 1, the essential means required for flash butt welding of annular workpieces are the machine bed 3, the clamping block 4, the upsetting carriage or slide 5 loaded by feed cylinder 6 and the weld gripping jaws 2 and 2' associated with clamping block 4, and the upsetting carriage or slide 5. Workpiece 1 is clamped between these gripping jaws.

The preheating operation will be explained by means of the time curves for welding current I, carriage feed S and feeding force F in FIG. 2. The feeding force $F_1$ generated by feed cylinder 6 for the first preheat time cycle is chosen so low that in accordance with the inequality $$F \geq F_K + F_V + F_R$$

$F_1$ is slightly larger than the opposite forces $F_K + F_V + F_R$ and so that a feed movement of the feed carriage with a clamped annular workpiece is possible due to this inequality. $F_K$ is the contact force in the weld gap, and $F_V$ is the deformation force for the deformation of the annular workpieces. $F_R$ is the force required for overcoming carriage friction.

During the preheat time cycles there is a given amount of material consumption of the two welding ends and an amount of upsetting of the two welding ends so that the subsequent preheat time cycles require an increasing feed of the upsetting carriage or slide over the preceding preheat cycles in order to obtain again a flow of welding current. For this purpose, the workpiece must be deformed more than with the preceding preheat time cycles; to achieve this, the feeding force $F_1$ must be increased by an amount $\Delta F$ to overcome the increasing deformation resistance. This force increment $\Delta F$ is achieved by known means (not shown) by increasing the pressure of the pressure medium for the feed cylinder 6. The amount of force increment, expressed by $\Delta F = F_{n+1} - F_n$, where n is the number of preheat time cycles and F is the feeding force, depends solely on the deformation resistance of the workpiece since the contact force $F_K$ and the force $F_R$ for overcoming the carriage friction remain constant.

Conversely, the deformation resistance $F_V$ depends not only on the modulus of elasticity of the material, the cross-section of the workpiece, its bending die and on the ring diameter, but also on its temperature. Since with increasing preheat cycles, owing to the current flow through the rear of the workpiece via its ohmic resistance, there is a heating effect, the increase in deformation resistance with increasing workpiece deformation is being superposed by a decrease in deformation resistance caused by the heating of the workpiece. Accordingly, the feeding force increment $\Delta F$ may become smaller with advancing preheat time cycles.

In an actual embodiment of the present invention, it has been found that the total force increment between the first and the last preheat time cycle is about 50%, with the average force increment $\Delta F$ per preheat time cycle lying between 5 and 10%.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for flash butt welding of annular workpieces, particularly chain type of links, comprising the steps of: preheating workpiece ends to be welded before flashing and upsetting; applying successive preheat time cycles; controlling a feeding force for an upsetting slide during said successive preheat time cycles; minimizing said feeding force during the first preheat time cycle; increasing the feeding force progressively during advancing preheat time cycles depending on the increase in force required for workpiece deformation; flash welding and upsetting said workpiece ends to be welded.

2. A method as defined in claim 1 wherein said feeding force has a decreasing increment during advancing preheat time cycles.

3. A method as defined in claim 2 wherein said feeding force has a stepwise increase per preheat time cycle.

4. A method as defined in claim 2 wherein said feeding force has a continuous increased magnitude.

5. A method as defined in claim 1 wherein the total force increment between the first and last preheat time cycle is substantially 50%, the average force increment per preheat time cycle being within the range of substantially 5 to 10%.

6. A method as defined in claim 1 wherein said step of applying successive preheat time cycles increase substantially the speed of preheating the workpiece ends to be welded.

* * * * *